Dec. 11, 1928.
W. G. BAYHA
GAUGE
Filed April 14, 1927
1,694,838
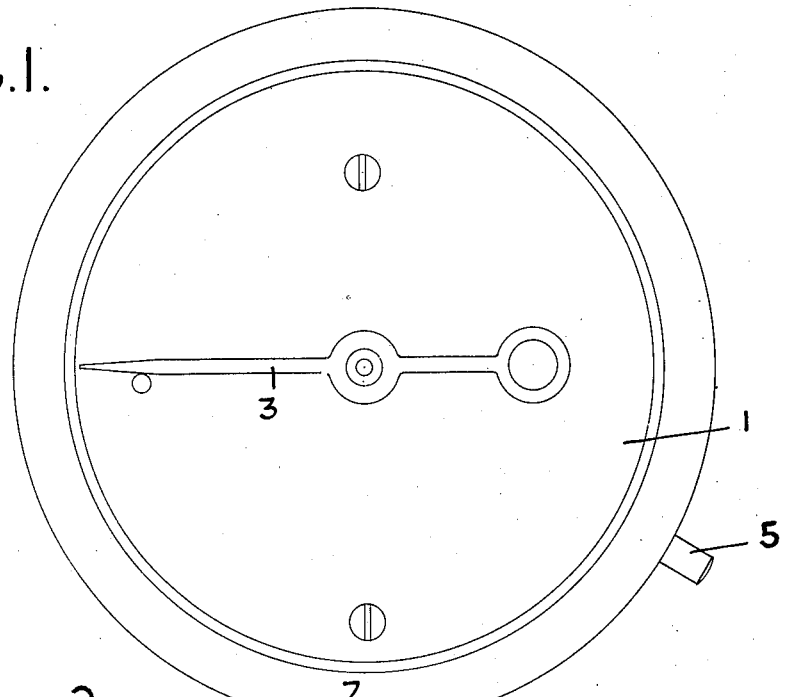
Fig.1.
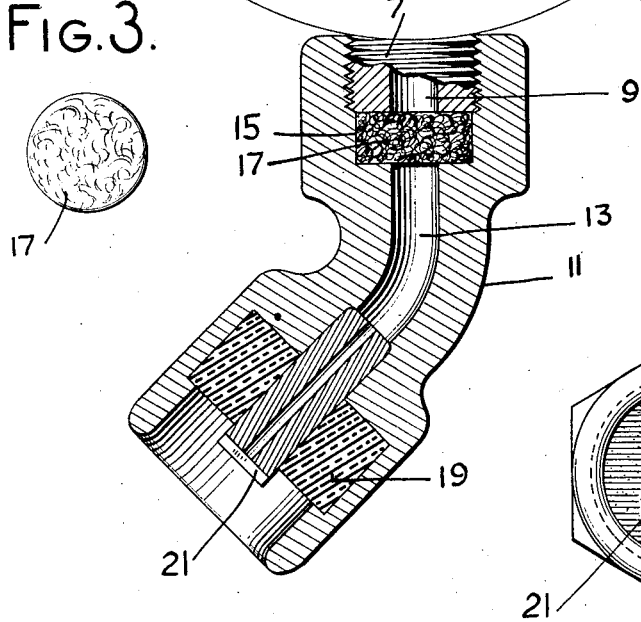
Fig.3.
Fig.2.
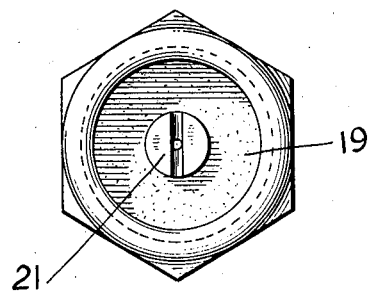
INVENTOR
William G. Bayha
BY
C. Messick
ATTORNEY Patented Dec. 11, 1928.

1,694,838

UNITED STATES PATENT OFFICE.

WILLIAM G. BAYHA, OF PERKASIE, PENNSYLVANIA, ASSIGNOR TO UNITED STATES GAUGE COMPANY, OF NEW YORK, N. Y., A CORPORATION OF PENNSYLVANIA.

GAUGE.

Application filed April 14, 1927. Serial No. 183,654.

My invention pertains to gauges generally, and specifically to automobile tire gauges provided with manual resets.

The broad object of my invention is to provide a cheap, simple, effective, non-clogging means for limiting the speed at which fluid can affect the Bourdon tube or equivalent pressure responsive element of a gauge so that the pointer will not "jump" and thus either harm the gauge mechanism or give a false reading.

The specific object of my invention is to combine such a means with a manually operated reset automobile tire gauge where the conditions under which the gauge is used are very severe; the dry dust-laden blast from the tire valve as the gauge is applied being particularly troublesome when a fine hole is relied upon to decelerate the inrush of air, for the dust frequently clogs the hole. Some form of decelerator is however essential particularly with manual reset tire gauges, to prevent the jumping of the pointer causing too high a reading, and my invention accomplishes the result effectively at low cost.

The following is a detailed description of one specific embodiment of my invention.

Referring to the accompanying drawings:—

Fig. 1 is a diagrammatic enlarged front elevation of a tire gauge partly in cross section.

Fig. 2 is an end view of the release pin of Fig. 1 and adjacent members, and

Fig. 3 is an elevation of the decelerator of Fig. 1.

The numeral 1 indicates the body of a manual release tire tester or gauge provided with an indicator 3, a manual release button 5, and a threaded stem 7 through which there extends a hole 9. Upon the stem 7 is screwed a fitting 11 which is provided with a hole 13 and a recess 15 containing a porous decelerator 17, consisting of a very fine quality felt disk which prevents the inrush of air through the passage 9 when the valve is applied, causing the indicator 3 to jump and give a false reading. Washer 17 also acts as a dirt excluder and thus prevents ingress of such dirt to the passage 9 and into the gauge 1. Fitting 11, is provided at its lower end with a conventional soft rubber washer 19 to seal the joint when this tire gauge is applied to a conventional tire valve and a conventional release pin 21 is provided extending through washer 19 and secured in fitting 11.

I do not limit myself to the exact construction shown but the scope of my invention is pointed out in the appended claims.

I claim:

1. A tire tester gauge provided with a watch-shaped body and dial, a manual reset button at the edge thereof, a threaded boss at the bottom of the gauge provided with a passage whereby pressure may enter the gauge, a fitting having a central passage throughout its length, small at the middle and enlarged at each end and provided with a thread at the end of the upper enlargement, screwed onto the boss, a continuation of the enlargement in the fitting below the threaded portion, a porous decelerator therein engaging said threaded boss, a bend in the median portion of the fitting whereby the convenience of operating the gauge may be increased, an enlargement of the passage in the lower end of the fitting provided with a tubular release pin pressed thereinto, a further enlargement of greater diameter and an elastic washer therein around the release pin to seal the fitting to a valve when pressed thereon.

2. A tire tester comprising a gauge having a threaded boss provided with a pressure receiving passage, a fitting threaded at one end to engage said threaded boss to secure it to said gauge, said fitting consisting of a member having a passage extending longitudinally therethrough from a cup shaped mouth disposed adjacent the other end thereof and designed to be brought into engagement with a tire valve, a washer and a valve release pin arranged in said cup-shaped mouth, and a decelerator in the form of a disk of felt of substantial thickness and of a degree of porosity effective to serve as an air filter and to decelerate the flow of air into said gauge, said disk being disposed in said fitting adjacent its connection to said gauge and being maintained under pressure by the threaded boss that secures said fitting to said gauge.

3. A fitting for a tire tester gauge comprising a member having a passage extending longitudinally therethrough, said member being provided with a cup-shaped mouth at each end, a washer and a valve release pin arranged in one of said cup-shaped mouths and a decelerator in the form of a disk of felt of substantial thickness and of a degree of porosity effective to serve as an air filter and to decelerate the flow of air through said fitting disposed in the other of said cup-shaped mouths, the end of said fitting adjacent said decelerator being threaded to hold said fitting in assembled relation to the gauge with a portion of the latter disposed in contact with said decelerator.

WILLIAM G. BAYHA.